(12) United States Patent
DeHaan

(10) Patent No.: US 8,219,611 B2
(45) Date of Patent: Jul. 10, 2012

(54) SYSTEMS AND METHODS FOR PROVIDING A COMPLETE VIEW OF LARGE COMPUTING NETWORKS

(75) Inventor: Michael Paul DeHaan, Morrisville, NC (US)

(73) Assignee: Red Hat, Inc., Raleigh, NC (US)

( * ) Notice: Subject to any disclaimer, the term of this patent is extended or adjusted under 35 U.S.C. 154(b) by 151 days.

(21) Appl. No.: 12/473,947

(22) Filed: May 28, 2009

(65) Prior Publication Data

US 2010/0306305 A1    Dec. 2, 2010

(51) Int. Cl.
*G06F 15/16* (2006.01)
(52) U.S. Cl. ........ 709/203; 709/217; 709/206; 709/202; 709/201; 709/205
(58) Field of Classification Search .................. 709/203, 709/217, 206, 202, 201, 205
See application file for complete search history.

(56) References Cited

U.S. PATENT DOCUMENTS

| 7,579,960 | B2 * | 8/2009 | Cheng et al. | ................... 340/8.1 |
| 2006/0100829 | A1 * | 5/2006 | Lynch et al. | ...................... 703/1 |
| 2008/0208897 | A1 * | 8/2008 | Lew et al. | ................. 707/103 R |

OTHER PUBLICATIONS

"Systems and Methods for Remote Management of Networked Systems Using Secure Modular Platform", U.S. Appl. No. 12/130,424, filed May 30, 2008, Michael DeHaan et al.

* cited by examiner

*Primary Examiner* — Lan-Dai T Truong
(74) *Attorney, Agent, or Firm* — Lowenstein Sandler PC

(57) ABSTRACT

The management tool can determine and store all information that is relevant to the computing systems in the network. The management tool can generate and provide reports that are customizable by a requester. The management tool can receive a request to generate a report which specifies the information relevant to the computing systems to be included in the report. The management tool can search the stored information and generate the report with the stored information that matches the request. The reports can include network topology maps based on the request and geographic maps based on the request.

18 Claims, 8 Drawing Sheets

| COMPUTING SYSTEM 126 | | ID: xyz | | |
|---|---|---|---|---|
| Location | 100 1st St. New York | 1st Floor Office 1A | ... | |
| Network Details | MAC Address: | IP Address: | ... | |
| Hardware | Processor: Intel Core 2 | Memory: CORSAIR PC 3200 1GB | ... | |
| Software | OS: RHEL v5 | App: Apache V1 | ... | |
| Config. Data | BIOS AMI v3 | | ... | |
| ⋮ | ⋮ | ⋮ | | |

FIG. 2

LIST: RHEL v5

1. Computing System 126
    - ID. xyz
    - Location: 100 1st St.
                New York
                1st Floor
                Office 1A

FIG. 4

SYSTEMS AND METHODS FOR PROVIDING A COMPLETE VIEW OF LARGE COMPUTING NETWORKS

FIELD

This invention relates generally to network management.

DESCRIPTION OF THE RELATED ART

Most entities such as companies and universities operate large networks of computing systems. These networks are typically made up of a wide variety of computing systems, such as servers providing various services and individual computing systems. As such, the computing systems in the network varying greatly in the hardware and software contained in the computing systems. Additionally, the computing systems in the network are often located in different physical locations. For example, a company may operate a network which spans multiple geographic regions (e.g. cities, countries, continents) and multiple regions in a single geographic region (e.g. multiple office building, different floors in the office building, different offices in the office building).

One or more system administrators are tasked with the job of tracking and maintaining the computing systems in the network. This involves diagnosing and fixing problems in the computing systems, insuring that the systems are properly configured, and the like. These large networks also tend to grow and change organically over time. New computing systems may be added to the network or computing systems may be removed from the network. Additionally, the computing systems themselves change over time. The computing systems are reconfigured, new hardware and software are added, hardware and software are upgraded, and the like. As such, the administrator of these large networks are presented with a large and every-changing task of tracking the computing systems. If the network is supported by multiple administrators, these administrators must coordinate their work so that the network stays in proper working order. Additionally, as administrators leave their jobs, the new administrators must learn the outlay of the network. Often this can be difficult because administrators lack the ability to capture and view an entire layout of the network.

BRIEF DESCRIPTION OF THE DRAWINGS

Various features of the embodiments can be more fully appreciated, as the same become better understood with reference to the following detailed description of the embodiments when considered in connection with the accompanying figures, in which:

FIG. 2 illustrates an exemplary inventory record, according to various embodiments;

FIG. 4 illustrates an exemplary list generated by the management tool, according to various embodiments;

DETAILED DESCRIPTION OF EMBODIMENTS

Figure 1:
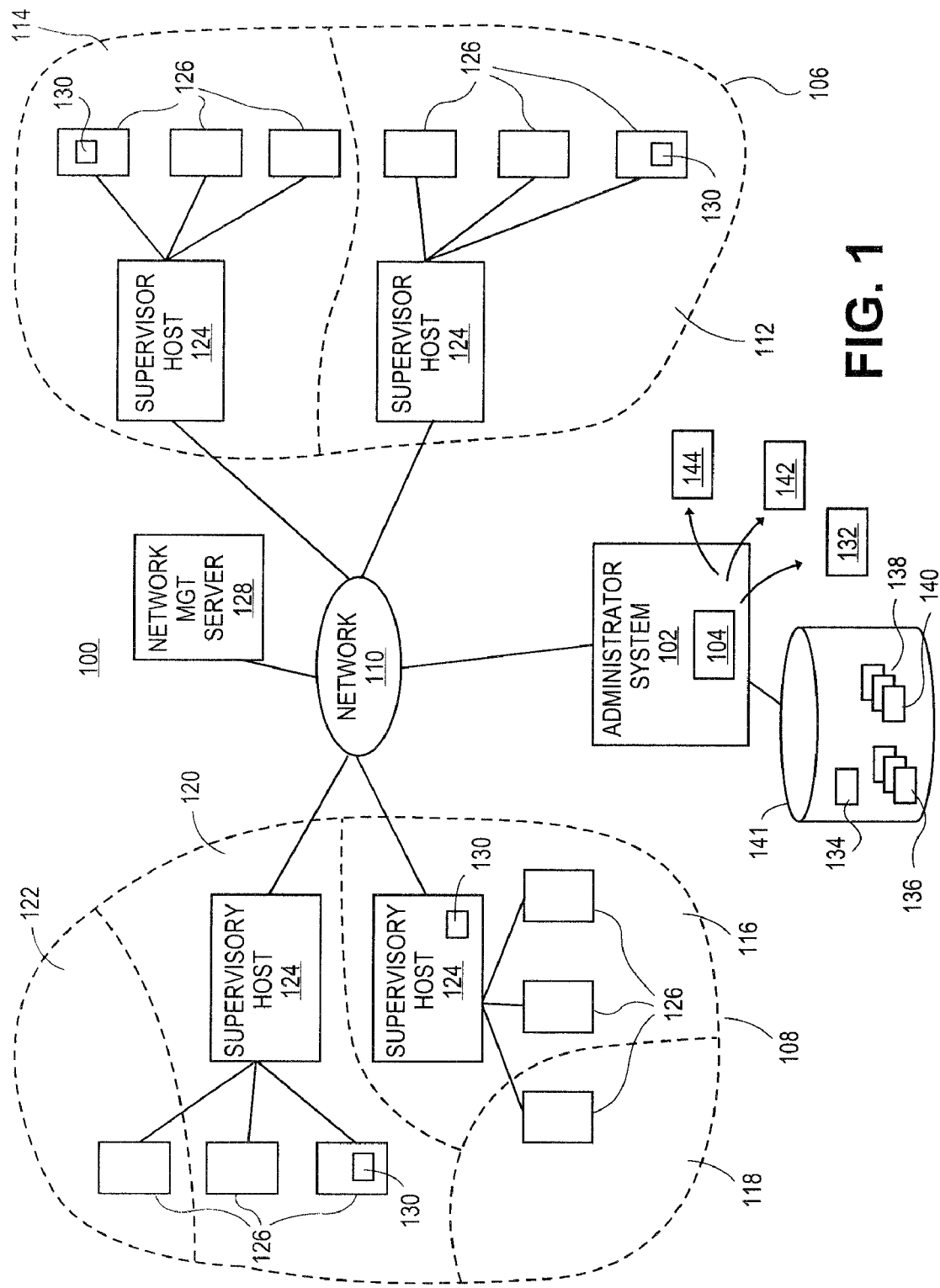
FIG. 1 illustrates a large enterprise network of computing systems implementing a management tool in which various embodiments of the present teachings can be practiced.

For simplicity and illustrative purposes, the principles of the present teachings are described by referring mainly to exemplary embodiments thereof. However, one of ordinary skill in the art would readily recognize that the same principles are equally applicable to, and can be implemented in, all types of information and systems, and that any such variations do not depart from the true spirit and scope of the present teachings. Moreover, in the following detailed description, references are made to the accompanying figures, which illustrate specific embodiments. Electrical, mechanical, logical and structural changes may be made to the embodiments without departing from the spirit and scope of the present teachings. The following detailed description is, therefore, not to be taken in a limiting sense and the scope of the present teachings is defined by the appended claims and their equivalents.

Embodiments of the present teachings relate to systems and methods for managing a large, enterprise network of computing systems and devices. More particularly, an administrator can utilize a management tool to inventory the network and generate customized views of the network.

According to embodiments, an administrator system can be configured to include a management tool. The management tool can be configured to determine all information that is relevant to the computing systems in the network. This information can include a unique identification of each computing system, the physical location of the computing systems (geographic and region location), the network location of each computing system (gateway, network address, location in the network hierarchy, etc.), types of hardware contained in each computing system (processors, memory, network interfaces, storage, etc.), types software executing on each computing system (operating systems (OS), application programs, etc), the configuration of each computing system, and the like. The management tool can determine all the relevant information by directly querying and communicating with the computing systems, by communicating with other management systems such as a network management server, by communicating with the monitoring agent executing on the computing systems, and by receiving information from the administrator or other persons. The management tool can be configured to classify and to store this information in a set of records.

According to embodiments, the management tool can be configured to generate and to provide reports that are customizable by a requester. The management tool can be configured to receive a request to generate a report which specifies the information relevant to the computing systems to be included in the report. The management tool can be configured to search the stored records and generate the report with the stored information that matches the request. The reports can include network topology maps based on the request and geographic maps based on the request.

By utilizing the management tool, the network management server can inventory the entire network of the computing systems and determine all the information relevant to those computing systems, thereby providing a complete view of the network. Likewise, by generating customizable reports, the management tool can allow an administrator to easily determine specific information about the network. As such, the management tool can reduce the time and effort of managing the network by providing a complete view of the network from a single administrator system.

FIG. 1 illustrates a large enterprise network system 100, according to various embodiments of the present teachings. In embodiments as shown, an administrator system 102 can include a management tool 104 for managing the network system 100. While FIG. 1 illustrates a number of computing systems located in several geographic regions and connected by one or more networks, one skilled in the art will realize that network system 100 can comprise any number of computing system and networks located in any number of geographic locations and/or regions.

In embodiments, the network system 100 can include a number of computing systems located in different geographic locations 106 and 108 connected by one or more networks 110. The geographic locations 106 and 108 can be any type of geographic divisions such as a city, state, country, continent, and the like. For example, geographic location 106 can be New York City in the United States and geographic location 108 can be Tokyo in the Japan. Additionally, within the geographic locations 106 and 108, the computing systems can be located at different regions 112, 114, 116, 118, 120, and 122 within the geographic locations 106 and 108. The different regions 112, 114, 116, 118, 120, and 122 can be any type of sub-divisions of the geographic location 106 and 108 such as an office building at a street address, a floor of the office building, a particular office in the office building, and the like. For example, region 112 in geographic location 106 can be the $1^{st}$ floor of an office building located at 100 $1^{st}$ Street and region 114 can be the $2^{nd}$ floor of the office building located at 100 $1^{st}$ Street.

In embodiments, the one or more networks 110 can be or include the Internet, or other public or private networks. The one or more or more networks 110 can be or include wired, wireless, optical, and other network connections. One skilled in the art will realize that the one or more networks 110 can be any type of network, utilizing any type of communication protocol, to connect the computing systems.

In embodiments as illustrated in FIG. 1, the computing systems in the network system 100 can include a variety of different computing systems. The network system 100 can include a number of supervisory hosts 124. The supervisory hosts 124 can be or include a set of servers configured to communicate with entities at other levels of the network system 100 such as the one or more networks and/or associated connections. The supervisory hosts 124 can be configured to communicate with an intermediate set or sets of hosts, gateways, or servers. The supervisory hosts 124 can be configured to function as "overlord" hosts or servers which communicate with an underlying or low-level computing systems 126, or other devices in the network system 100. The computing systems 126 can include any type of computing systems or other devices such as such as servers, personal computers, laptop computers, network-enabled media devices, networked stations, etc.

In embodiments, the supervisory hosts 124 can be configured to support or serve underlying networks in the network system 100, for example via a local area network, or other network(s) or connections. Other hierarchies, topologies, and connections between the supervisory hosts 124, any intermediate hosts, the computing systems 126, and/or other entities or devices of the network system 100 can be used.

In embodiments, the network system 100 can also include the administrator system 102. The administrator system 102 can be configured to monitor and to manage the network system 100. The administrator system 102 can be any type of computing system or other device such as such as a server, personal computer, laptop computer, network-enabled media device, networked station, etc. The administrator system 102 can be coupled to the one or more networks 110 in order to communicate with the supervisory hosts 120 and the computing systems 126. The administrator system 102 can be operated by an administrator to monitor and maintain the network system 100. The administrator system 102 can be located in any of the geographic regions 106 or 108 or any other location.

In embodiments, the administrator system 102 can be configured to include the management tool 104. The management tool 104 can be configured to allow the administrator to inventory the computing systems in the network system 100 and generate various views of the network system 100 to be used in managing and maintaining the network system. In particular, the management tool 104 can be configured to determine a 360 degree view of the computing systems in the network system 100. The management tool 104 can determine all information that is relevant to the supervisory hosts 124 and the computing systems 126. This information can include a unique identification of each computing system, the physical location of the computing systems (continent, city, address, office building, office or other specific location or region), the network location of each computing system (gateway, network address, location in the network hierarchy, etc.), types of hardware contained in each computing system (processors, memory, network interfaces, storage, etc.), types software executing on each computing system (operating systems (OS), application programs, etc), the configuration of each computing system, state information of the computing systems (computing system temperature, processor temperature, computing system power usage, storage load, processor load, memory load, etc.), and the like.

In embodiments, to determine the information relevant to each computer system, the management tool 104 can be configured to gather information on the network 110, the supervisory host 124, and the computing systems 126 utilizing a variety of processes and methods. The management tool 104 can be configured to directly query and examine the supervisory host 124 and the computing systems 126 in order to determine the information relevant to each computing system. To enable this, the management tool 104 can be configured to include the necessary logic, commands, and protocols to query and to examine each of the supervisory hosts 124 and the computing systems 126 to determine the information relevant to the computing systems.

In embodiments, the management tool 104 can be configured to communicate with other systems in order to determine the information relevant to each computing system. The management tool 104 can be configured communicate with a network management server 128. The network management server 128 can be any type of network management application or tool to securely communicate with the supervisory hosts 124 and the computing systems 126, to monitor the state of the supervisory hosts 124 and the computing systems 126, to retrieve and request data from the supervisory hosts 124 and the computing systems 126, and to manage and direct the supervisory hosts 124 and the computing systems 126. For example, the network management system 208 can be a "FUNC" server as described in U.S. patent application Ser. No. 12/130,424, filed May 30, 2008, entitled "SYSTEMS AND METHODS FOR REMOTE MANAGEMENT OF NETWORKED SYSTEMS USING SECURE MODULAR PLATFORM" (U.S. Patent Application Publication No. US-2009-0300180-A1) assigned to Red Hat Corporation, the disclosure of which is incorporated herein, in its entirety, by reference.

In embodiments, the management tool 104 can be configured to communicate with application programs executing on the supervisory host 124 and the computing systems 126 in order to determine the information relevant to each computing system. For example, in order to aid in identifying the information, one or more of the supervisory hosts 124 and the computing systems 126 can include a monitoring agent 130. The monitoring agent 130 can be configured to examine the supervisory host 124 and the computing systems 126 and to provide the information to the network management tool 104. The monitoring agent 130 can provide the information directly to the management tool 104 and/or to other systems in the network system 100 such as the network management server 128. The monitoring agent 210 can be configured to include the necessary logic, routines, instruction, and commands to communicate with the hardware and software resources of the supervisory hosts 124 and the computing systems 126 and to monitor the supervisory hosts 124 and the computing systems 126 for state information in order to identify the information relevant to the computing systems.

In embodiments, in addition to gather the information from the computing systems, the management tool 104 can be configured to collect the information relevant to the supervisory hosts 124 and the computing systems 126 from the administrator of the network 100 or other persons. The management tool 104 can be configured to generate an interface 132 that enables the administrator to enter information about the supervisory hosts 124 and the computing systems 126. To enable this, the management tool 104 can be configured to include the necessary logic, commands, and protocols to generate the interface 132 and to receive the information entered into the interface 132. For example, the management tool 104 can be configured to include one or more application programming interfaces (APIs) to generate graphic user interfaces (GUIs) that allow the administrator to enter the information.

In embodiments, once the management tool 104 has collected the information relevant to the supervisory hosts 124 and the computing systems 126, the management tool 104 can be configured to classify the information and store the information in various records. As illustrated, the management tool 104 can be configured to classify and to store the information in three records: a network map 134, a geographic and region maps 136, and a set 138 of inventory records 140. The management tool 104 can be configured to maintain the network map 134, the geographic and region maps 136, and the set 138 of inventory records 140 in computer readable storage devices or media 141 (CD, DVD, hard drive, portable storage memory, etc.) whether local to the administrator system 102 or remotely located.

In embodiments, the management tool 104 can maintain the network map 134, the geographic and region maps 136, and the set 138 of inventory records 140 in order to describe and classify the various aspects of the network system 100. The network map 134 can be configured to record information related to the configuration and topology of network connections between the supervisory hosts 124, the computing systems 126, and/or other entities or devices of the network system 100, as well as other data. For example, the network map 134 can be recorded in a file, tree, database, or other record. The geographic and region maps 136 can be configured to record information related to the physical location of the supervisory host 124, the computing systems 126, and/or other entities or devices in the network system 100. For example, the geographic and region maps 136 can be recorded in a file, tree, database, or other record.

In embodiments, the set 138 of inventory records 140 can be configured to store all the collected information related to the supervisory hosts 124 and the computing systems 126. Each inventory record 140 in the set 138 can be configured to store the information related to one supervisory host 124 or computing system 126. For example, the set 138 of inventory records 140 can be recorded in a file, tree, database, or other record. Each inventory record 140 can include a unique identifier of the supervisory host 124 or computing system 126 for which it contains information, such as Media Access Control ("MAC") address, Ethernet Hardware Address ("EHA"), computing system name, and the like. Additionally, the inventory record 140, for that particular supervisory host 124 or computing system 126, can include all the information relevant to that particular supervisory host 124 or computing system 126 such as the geographic and region location of the computing systems (continent, city, address, office building, office or other specific location or region), the network location of each computing system (gateway, network address, location in the network hierarchy, etc.), types of hardware contained in each computing system processors, memory, network interfaces, storage, types software executing on each computing system (operating systems (OS), application programs, etc), the configuration of each computing system, state information of the computing systems (computing system temperature, processor temperature, computing system power usage, storage load, processor load, memory load, etc.) and the like.

FIG. 2 illustrates an exemplary inventory record 140 for a particular computing system 126, according to various embodiments. As illustrated, the inventory record 140 can include the unique identifier of the computing system 126. Additionally, the inventory record 140 can include a number of rows 210 for each category of information relevant to the computing system 126, for instance, location, network details, hardware, software, configuration data, and the like. The inventory record 140 can include a number of columns 215 associated with each row 210 that contain the specific information in each category for the computing system 126. While FIG. 2 illustrates an exemplary inventory record 140 that includes information stored in a table format, one skilled in the art will realize that the information can be stored in any format that categorizes the information relevant to the supervisory hosts 124 and the computing system 126.

In embodiments, the management tool 104 can be configured to provide the information stored in the network map 134, the geographic and region maps 136, and the set 138 of inventory records 140 to the administrator or other persons in a variety of views, such as reports, lists and maps. In particular, the management tool 104 can be configured to allow the administrator or other persons to select particular information from the network map 134, the geographic and region maps 136, and the set 138 of inventory records 140 to be included in the variety of views In response, the management tool 104 can be configured to generate and to provide various lists and maps 144 to the administrator or other persons. For example, the management tool 104 can be configured to generate lists and maps 144 that can be displayed on a display associated with the administrator system 102, printed out by a device associated with the administrator system, or any other form viewable by the administrator or other persons.

In embodiments, to generate the lists and maps 144, the management tool 104 can be configured to receive the type of lists and maps 144 to generate and the specific information to include in the lists and maps 144. In response, the management tool 104 can be configured to search the network map 134, geographic and region maps 136, and the set 138 of inventory records 140 in order to retrieve the specific information requested. The management tool 104 can be configured to generate the lists and maps 144 according to the information retrieved and the type of lists and maps requested. To enable this, the management tool 104 can be configured to include the necessary logic, commands, and protocols to generate an interface 142 for receiving selection from the administrator, to search the network map 134, geographic and region maps 136, and the set 138 of inventory records 140, and to generate the lists and maps 144. For example, the management tool 104 can be configured to include one or more application programming interfaces (APIs) to generate graphic user interfaces (GUIs) that allow the administrator to enter the information, to interface and search the network map 134, geographic and region maps 136, and the set 138 of inventory records 140, and to provide the lists and maps 144 to the administrator.

Figure 3:
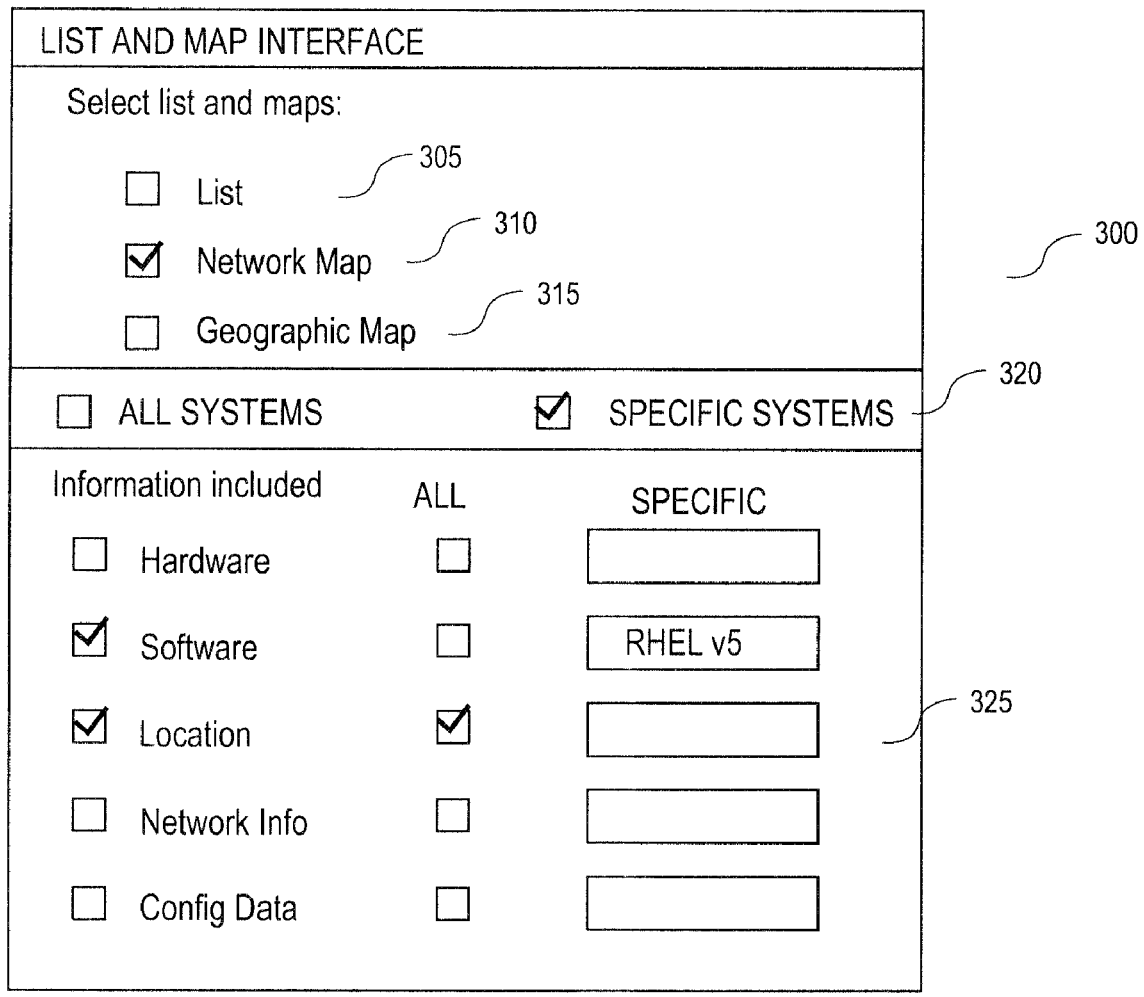
FIG. 3 illustrates an exemplary interface for requesting lists and maps, according to various embodiments.

FIG. 3 illustrates an exemplary interface 300 generated by the management tool 104 for allowing the administrator to request the lists and maps 144, according to embodiments. As illustrated, the management tool 104 can be configured to generate the interface 300 to include various buttons, fields, and widgets to allow the administrator to select the type of lists and maps 144 to generate and the information to include in the lists and maps 144. For instance, the interface 300 can include selection boxes 305, 310, and 315 that allow the administrator to select a list, network map, or geographic map, respectively, to be generated. Additionally, the interface 300 can include selection boxes 320 that allow the administrator to select, for inclusion in the lists and maps 144, either all the computing systems or only those computing systems that meet the specified types of information. Likewise, the interface 300 can include various buttons and fields 325 to specify the type of information to search for and include in the lists and maps 144.

For instance, as illustrated in FIG. 3, the administrator can select to generate a network map that includes only specific computing systems containing the Red Hat Enterprise Linux (RHEL) operating system version 5, from all locations. The management tool 104 can be configured to allow the administrator to select multiple types of lists and maps 144 to be generated and multiple types of information to include in the lists and maps 144.

In embodiments, the management tool 104 can be configured to generate and to provide the administrator various lists of the supervisory host 124 and/or computing systems 126 that are at a particular location, contain particular hardware, contain particular software, have a particular configuration. For example, the management tool 104 can generate a list of all the supervisory host 124 and/or computing systems 126 that contain a hard drive manufactured by a particular vendor or a particular type of software.

FIG. 4 illustrates an exemplary list 400 that can be generated by the management tool 104 according to various embodiments. For instance, the administrator of the network system 100 can desire to know which of supervisory hosts 124 and/or computing systems 126 contain particular software, e.g. RHEL version 5. In this example, the administrator may determine that RHEL version 5 needs to be upgraded and desires to know which computing systems to upgrade. The management tool 104 can be configured to receive the request to generate the list specifying which of the supervisory hosts 124 and/or computing systems are running RHEL version 5. In response, the management tool 104 can search the set 138 of inventory records 140 to determine which of the supervisory hosts 124 and/or computing systems 126 contain RHEL version 5.

Then, the management tool 104 can generate the list 400 to include the identifier of the supervisory hosts 124 and/or computing systems 126 as well as other information. As illustrated in FIG. 4, the management tool 104 can generate the list 400 to include the location of each of the supervisory hosts 124 and/or computing systems 126 which contains RHEL version 5.

In embodiments, the management tool 104 can be configured to generate various maps that are customizable by the administrator or other person. The management tool 104 can be configured to generate and to provide network maps that illustrate the topology of the network system 100. The management tool 104 can be configured to allow the administrator or other person to select the particular computing systems to be displayed in the network map. For example, the management tool 104 can generate the network map to include only computing systems that have certain hardware or software, as selected by the administrator. Likewise, the management tool 104 can be configured to overlay the network map with the information relevant to the computing systems. For example, the management tool 104 can generate the network map to include all the computing systems which is overlaid by which computing systems contain particular hardware or software, as selected by the administrator.

Figure 5:
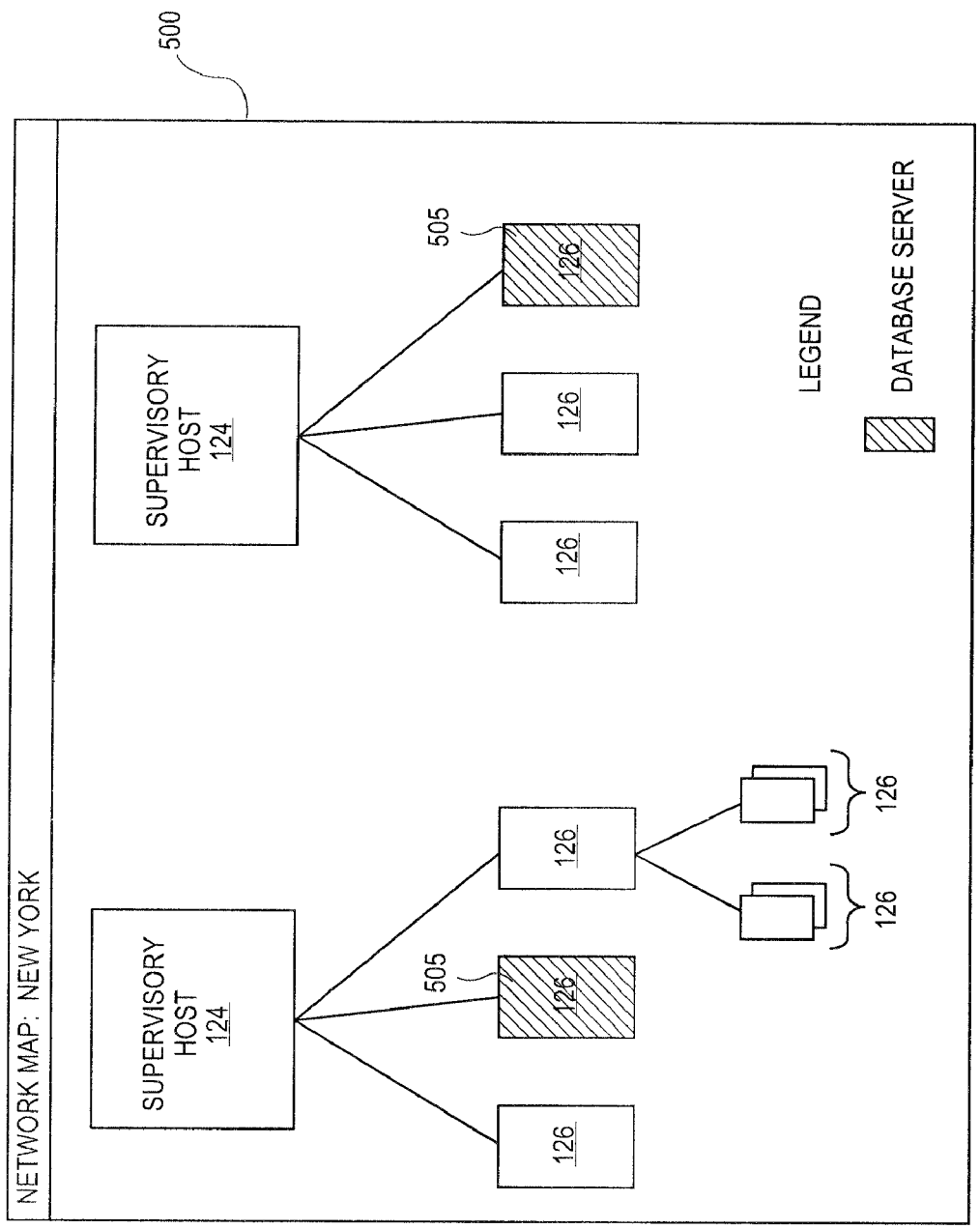
FIG. 5 illustrates an exemplary network map generated by the management tool, according to various embodiments.

FIG. 5 illustrates an exemplary network map 500 that can be generated by the management tool 104, according to various embodiments. For instance, the administrator of the network system 100 can desire to view a network map of which of the supervisory hosts 124 and/or computing systems 126 contain particular applications, e.g. database servers, in a particular geographic location, e.g. New York. In this example, the administrator may desire to know where the various database services are located in the network topology to ensure that the software loads on the computing systems are properly balanced. The management tool 104 can be configured to receive the request to generate the network map from the administrator specifying the supervisory hosts 124 and/or computing systems running database servers in New York. In response, the management tool 104 can search the set 138 of inventory records 140 to determine which of the supervisory hosts 124 and/or computing systems 126 are running database servers. Then, the management tool 104 can generate the network map 500 from the network map 134 based on the information in the set 138 of inventory records 140.

Then, the management tool 104 can generate the network map 500 to include all the supervisory hosts 124 and/or computing systems 126 overlaid with an indicator 505 of the supervisory hosts 124 and/or computing systems 126 running the database server. As illustrated in FIG. 5, the management tool 104 can generate the network map 500 to include a legend 510 to inform the administrator of the information displayed.

In embodiments, the management tool 104 can be configured to generate and to provide geographic and region maps that illustrate the geographic location of the computing systems of the network system 100. The management tool 104 can be configured to allow the administrator or other person to select the particular computing systems to be displayed in the geographic and region maps. For example, the management tool 104 can generate the geographic and region maps to include only computing systems that have certain hardware or software, as selected by the administrator. Likewise, the management tool 104 can be configured to overlay the geographic and region maps with the information relevant to the computing systems. For example, the management tool 104 can generate the geographic and region maps to include all the computing systems which is overlaid by which computing systems contain particular hardware or software, as selected by the administrator.

Figure 6:
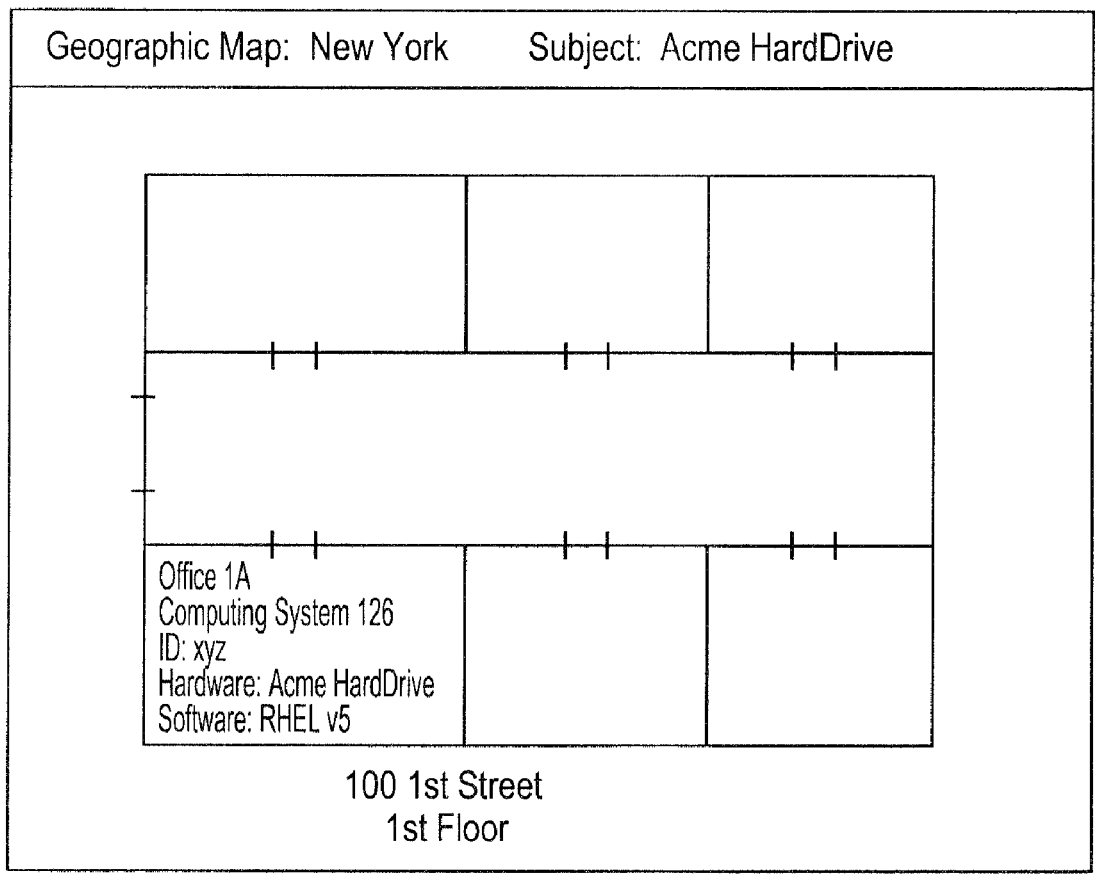
FIG. 6 illustrates an exemplary geographic map generated by the management tool, according to various embodiments.

FIG. 6 illustrates an exemplary geographic and region map 600 that can be generated by the management tool 104, according to various embodiments. For instance, the administrator of the network system 100 can desire to view a geographic and region map of which of the supervisory hosts 124 and/or computing systems 126 contain a particular hardware, e.g. Acme hard drive, in a particular geographic location, e.g. New York. In this example, the Acme hard drive may be experiencing errors that need repairs, and the administrator may desire to know the location of any comping systems so that the administrator can direct Acme repair personnel. The management tool 104 can be configured to receive the request to generate the geographic and region maps from the administrator specifying the supervisory hosts 124 and/or computing systems 126 containing the Acme hard drive in New York. In response, the management tool 104 can search the set 138 of inventory records 140 to determine which of the supervisory hosts 124 and/or computing systems 126 contain the Acme hard drive. Then, the management tool 104 can generate the geographic and region map 500 from the geographic and region maps 136 based on the information in the set 138 of inventory records 140.

Then, the management tool 104 can generate the geographic and region map 500 to include all the supervisory hosts 124 and/or computing systems 126 including the Acme hard drive and the specific location, New York. As illustrated in FIG. 6, the management tool 104 can generate the geographic and region map 500 to include other information about the computing system to aid the Acme repair personnel.

In the above examples, the lists and maps 144 are generated to display information regarding hardware and software of the supervisory hosts 124 and/or computing systems 126. One skilled in the art will realize that the lists and maps 144 can be generated to include any type of information relevant to the supervisory hosts 124 and/or computing systems 126. For example, the geographic map can be generated to include the supervisory hosts 124 and/or computing systems 126 overlaid with state information of the supervisory hosts 124 and/or computing systems 126 and other information.

Figure 7:
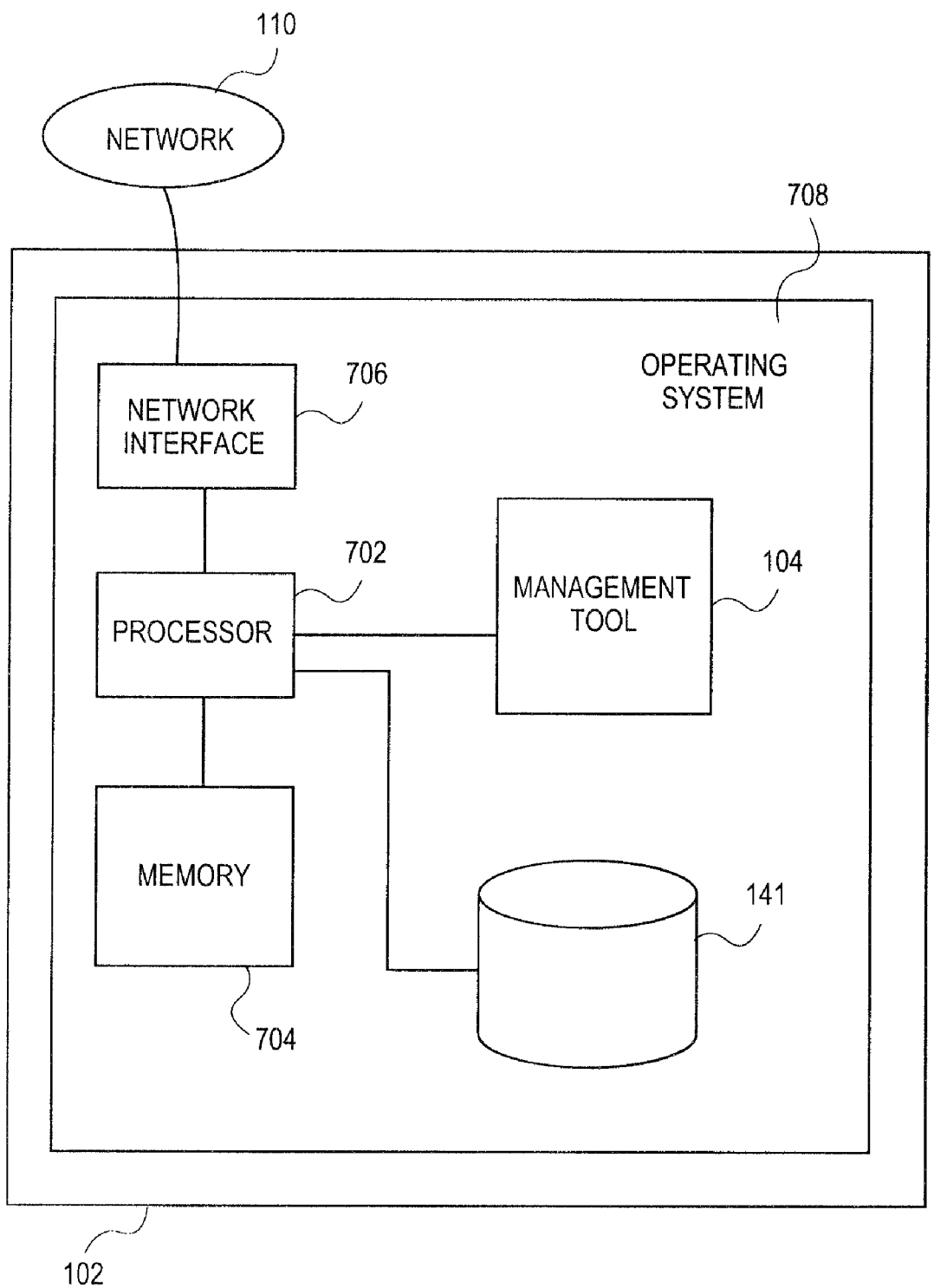
FIG. 7 illustrates an exemplary hardware configuration for an administrator computing system, according to various embodiments.

FIG. 7 illustrates an exemplary diagram of hardware and other resources that can be incorporated in the administrator system 102 and configured to communicate with the with the network system 100 via one or more networks 110, according to embodiments. In embodiments as shown, the administrator system 102 can comprise a processor 702 communicating with memory 704, such as electronic random access memory, operating under control of or in conjunction with operating system 708. Operating system 708 can be, for example, a distribution of the Linux™ operating system, such as SELinux, the Unix™ operating system, or other open-source or proprietary operating system or platform. Processor 702 also communicates with one or more computer readable storage devices or media 710, such as hard drives, optical storage, and the like, for maintaining the network map 134, the geographic and region maps 136, and the set 138 of inventory records 140. Processor 702 further communicates with network interface 706, such as an Ethernet or wireless data connection, which in turn communicates with one or more networks 110, such as the Internet or other public or private networks.

Processor 702 also communicates with the management tool 104, to execute control logic and allow perform the network management as described above and below. Other configurations of the administrator system 102, associated network connections, and other hardware and software resources are possible.

While FIG. 7 illustrates the administrator system 102 as a standalone system including a combination of hardware and software, the administrator system 102 can include multiple systems operating in cooperation. The management tool 104 can be implemented as a software application or program capable of being executed by the administrator system 102, as illustrated, or other conventional computer platforms. Likewise, the management tool 104 can also be implemented as a software module or program module capable of being incorporated in other software applications and programs. Further, the management tool 104 can also be implemented as a software module or program module capable of being incorporated in other management software applications and programs. In any example, the management tool 104 can be implemented in any type of conventional proprietary or open-source computer language. When implemented as a software application or program code, the management tool 104 can be stored in a computer readable storage medium, such as storage 710, accessible by the administrator system 102.

Figure 8:
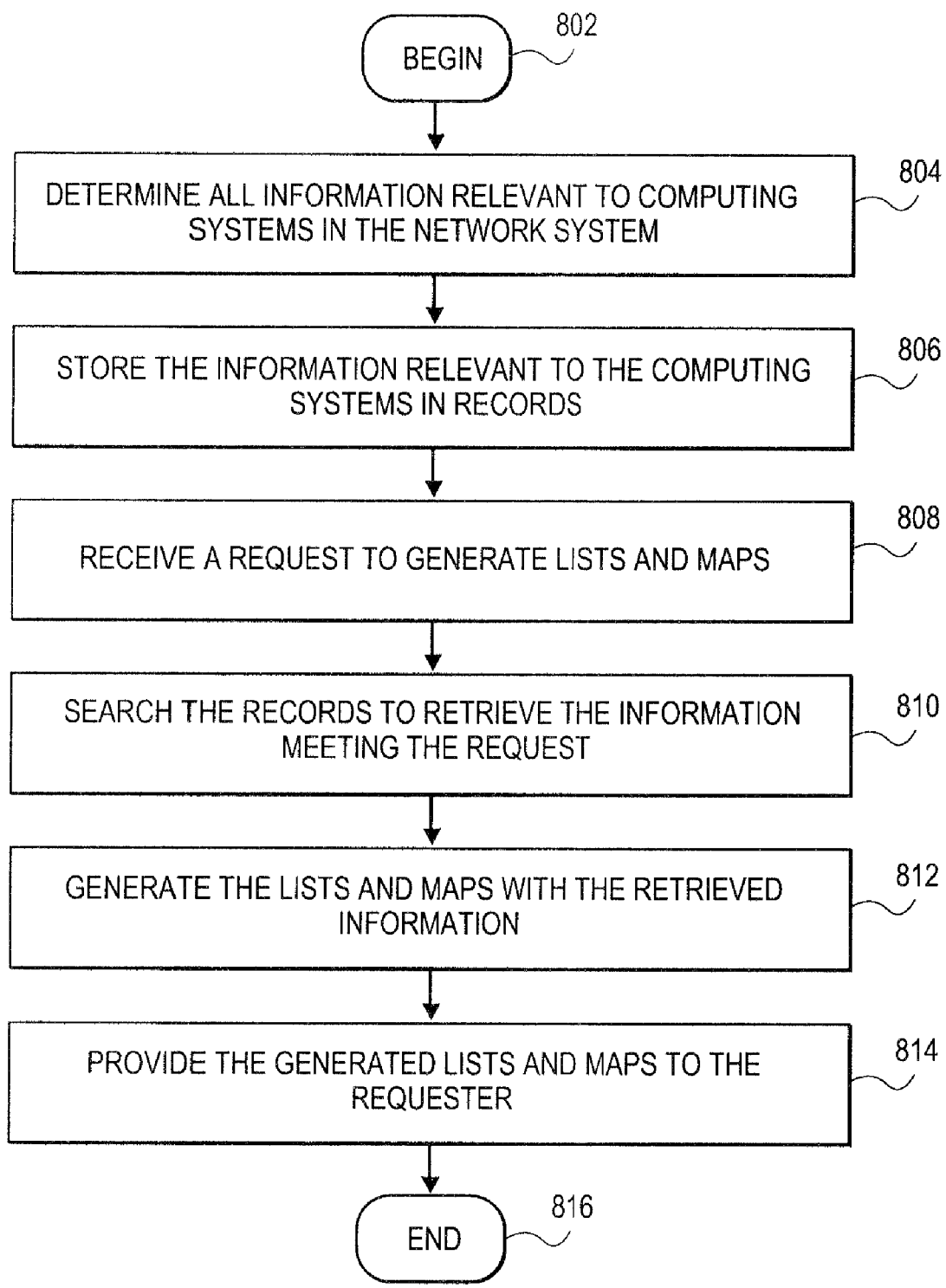
FIG. 8 illustrates a flowchart of an exemplary process for generating a complete view of a network, according to various embodiments.

FIG. 8 illustrates a flow diagram for managing a networks system 100, according to embodiments of the present teachings. In 802, the process can begin. In 804, the administrator system 102 can determine all information relevant to computing systems in the network system 100. For example, the management tool 104 can determine all information that is relevant to the supervisory hosts 124 and the computing systems 126. This information can include a unique identification of each computing system, the physical location of the computing systems (geographic and region location), the network location of each computing system (gateway, network address, location in the network hierarchy, etc.), types of hardware contained in each computing system (processors, memory, network interfaces, storage, etc.), types software executing on each computing system (operating systems (OS), application programs, etc), the configuration of each computing system, and the like. The management tool 104 can determine all the relevant information by directly querying and communicating with the supervisory hosts 124 and the computing systems 126, by communicating with other management systems such as the network management server 128, by communicating with the monitoring agent executing on the supervisory hosts 124 and the computing systems 126, and by receiving information from the administrator or other persons in an interface 132.

In 806, the administrator system 102 can store the information relevant to the computing systems in records. For example, the management tool 104 can classify and store the information in three records: a network map 134, a geographic and region maps 136, and a set 138 of inventory records 140. The management tool 104 can store the network map 134, the geographic and region maps 136, and the set 138 of inventory records 140 in computer readable storage devices or media 141 (CD, DVD, hard drive, portable storage memory, etc.) whether local to the administrator system 102 or remotely located.

In 808, the administrator system 102 can receive a request to generate lists and maps. For example, the management tool 104 can generate and provide an interface 142 for requesting the lists and maps 144 in 810, the administrator system 102 can search the records to retrieve the information meeting the request. For example, the management tool 104 can search the network map 134, the geographic and region maps 136, and the set 138 of inventory records 140 to retrieve the requested information.

In 812, the administrator system 102 can generate the lists and maps with the retrieved information. For example, the management tool 104 can generate various lists, network maps, and/or geographic maps of the supervisory host 124 and/or computing systems 126 that are at a particular location, contain particular hardware, contain particular software, have a particular configuration.

In 814, the administrator system 102 can provide the generated lists and maps to the requester. For example, the management tool 104 can generate the lists and maps 144 that can be displayed on a display associated with the administrator system 102, printed out by a device associated with the administrator system, or any other form viewable by the administrator or other persons. In 816, the process can end, but the process can return to any point and repeat.

Certain embodiments may be performed as a computer application or program. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include computer readable storage devices and media, and signals, in compressed or uncompressed form. Exemplary computer readable storage devices and media include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present teachings can be configured to access, including signals downloaded through the internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

While the teachings has been described with reference to the exemplary embodiments thereof those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Furthermore, to the extent that the terms "including", "includes", "having", "has", "with", or variants thereof are used in either the detailed description and the claims, such terms are intended to be inclusive in a manner similar to the term "comprising." As used herein, the term "one or more of" with respect to a listing of items such as, for example, A and B, means A alone, B alone, or A and B. Those skilled in the art will recognize that these and other variations are possible within the spirit and scope as defined in the following claims and their equivalents.

What is claimed is:

1. A method of managing a computer network, comprising:
  receiving, from a requestor a request for a physical location of at least one computing system having a particular configuration;
  identifying, by a computer processor, the physical location of at least one computing system having the particular configuration via a communication with one or more monitoring agents configured to examine computing systems in the computer network to determine relevant information comprising configuration information and state information of the computing systems;
  generating, by a computer processor, a report comprising the relevant information and a map that graphically illustrates the physical location of the at least one computing system having the particular configuration; and
  providing the report to the requestor in response to the request.

2. The method of claim 1, the method further comprising:
  determining information for a plurality of computing systems; and
  storing the information in a computer readable storage medium.

3. The method of claim 2, wherein determining the information comprises at least one of examining the computing systems to determine the information, communicating with a network management server to determine the information, communicating with an application executing on the computing system to determine the information, and receiving the information from an entity associated with the computing systems.

4. The method of claim 2, wherein the information further comprises configurations of the computing systems and state of the computing systems.

5. The method of claim 1, wherein receiving the request comprises:
  providing an interface for receiving the request.

6. The method of claim 2, the method further comprising:
  receiving a request for a network map of the plurality of computing systems;
  generating the network map that graphically illustrates a network topology of the computing systems based on the physical locations; and
  providing the network map.

7. A system for managing a computer network, comprising:
  a network interface communicatively connecting to computing systems in the computer network; and
  a hardware processor communicating with the network interface and executing a management tool, wherein the management tool being configured to:
  receive, from a requestor, a request for a physical location of at least one computing system having a particular configuration;
  identify the physical location of at least one computing system having the particular configuration via a communication with one or more monitoring agents configured to examine computing systems in the computer network to determine relevant information comprising configuration information and state information of the computing systems;
  generate a report comprising the relevant information and a map that graphically illustrates the physical location of the at least one computing system having the particular configuration; and
  provide the report to the requestor in response to the request.

8. The system of claim 7, the management tool being further configured to:
  determine information for a plurality of computing systems; and
  store the information in a computer readable storage medium.

9. The system of claim 8, wherein determining the information comprises at least one of examining the computing systems to determine the information, communicating with a network management server to determine the information, communicating with an application executing on the computing system to determine the information, and receiving the information from an entity associated with the computing systems.

10. The system of claim 8, wherein the information further comprises configurations of the computing systems and state of the computing systems.

11. The system of claim 8, the management tool being further configured to:
receive a request for a network map of the plurality of computing systems;
generate the network map that graphically illustrates a network topology of the computing systems based on the physical locations; and
provide the network map.

12. The system of claim 7, wherein receiving the request comprises:
providing an interface for receiving the request.

13. A non-transitory computer readable storage medium comprising instructions for causing a processor to perform a method comprising:
receiving, from a requestor, a request for a physical location of at least one computing system having a particular configuration;
identifying, by a computer processor, the physical location of at least one computing system having the particular configuration via a communication with one or more monitoring agents configured to examine computing systems in the computer network to determine relevant information comprising configuration information and state information of the computing systems;
generating, by a computer processor, a report comprising the relevant information and a map that graphically illustrates the physical location of the at least one computing system having the particular configuration; and
providing the report to the requestor in response to the request.

14. The non-transitory computer readable storage medium of claim 13, the method further comprising:
determining information for a plurality of computing systems; and
storing the information.

15. The non-transitory computer readable storage medium of claim 14, wherein determining the information comprises at least one of examining the computing systems to determine the information, communicating with a network management server to determine the information, communicating with an application executing on the computing system to determine the information, and receiving the information from an entity associated with the computing systems.

16. The non-transitory computer readable storage medium of claim 14, the method further comprising:
receiving a request for a network map of the computing systems;
generating the network map that graphically illustrates a network topology of the computing systems based on the physical locations; and
providing the network map.

17. The non-transitory computer readable storage medium of claim 13, wherein the relevant information further comprises configurations of the computing systems and state of the computing systems.

18. The non-transitory computer readable storage medium of claim 13, wherein receiving the request comprises:
providing an interface for receiving the request.

* * * * *